United States Patent [19]

Kume et al.

[11] Patent Number: 5,181,193
[45] Date of Patent: Jan. 19, 1993

[54] OPTICAL PICKUP DEVICE FOR A RECORDING AND/OR REPRODUCING APPARATUS

[75] Inventors: Hidehiro Kume, Tokyo; Etsufumi Yamamoto, Kanagawa; Yoshiyuki Matsumoto, Tokyo, all of Japan

[73] Assignee: Sony Corporation, Tokyo, Japan

[21] Appl. No.: 430,132

[22] Filed: Nov. 1, 1989

[30] Foreign Application Priority Data

Nov. 22, 1988 [JP] Japan .................................. 63-295679

[51] Int. Cl.$^5$ .............................................. G11B 7/135
[52] U.S. Cl. ............................ 369/44.23; 369/44.41; 369/44.42; 369/112
[58] Field of Search ................ 369/44.11, 44.12, 44.23, 369/44.32, 44.41, 44.42, 54, 112, 44.14

[56] References Cited

U.S. PATENT DOCUMENTS 4,521,680  6/1985  Ando ............................ 369/44.42 R
4,855,986  8/1989  Taki ............................ 369/44.37 R

*Primary Examiner*—Roy N. Envall, Jr.
*Assistant Examiner*—Hung Dang
*Attorney, Agent, or Firm*—Lewis H. Eslinger; Donald S. Dowden

[57] ABSTRACT

An optical pickup device for a recording and/or reproducing apparatus in which a light beam from a semiconductor laser element is converged by an object lens and irradiated on recording tracks of an optical disk and the light reflected by the disk is sensed to read and/or record data signals. The device includes photosensors each having an insensitive central zone and adapted to receive the reflected light to generate tracking error signals. The semiconductor laser element is so arranged that the light beam is projected on the optical disk so that the meridional plane of the light beam orthogonal to the junction plane of semiconductor layers of the semiconductor laser element is at such an angle with respect to a tangential line drawn to one of the recording tracks of the optical disk that non-symmetricities on both sides of said tangential line as a function of the de-focusing direction of the beam spot may be compensated.

7 Claims, 7 Drawing Sheets (a) DE-FOCUSING (−)  (b) FOCUSING  (c) DE-FOCUSING (+)

—— JITTER LEVEL (ns)
---- TRACHING ERROR (V)
—··— RE SIGNAL LEVEL (V)

OPTICAL PICKUP DEVICE FOR A RECORDING AND/OR REPRODUCING APPARATUS

BACKGROUND OF THE INVENTION

1. Field of the Invention

This invention relates to an optical pickup device adapted to record and/or reproduce data signals on or from an optical disk.

2. Related Prior Art

There is so far utilized an optical pickup device which is provided with a semiconductor laser element as a light source and in which a light beam emitted by the semiconductor laser unit is converged on a signal recording surface of an optical disk by a suitable optical system to record and/or read data signals on or from the signal recording surface.

This type of optical pickup device is provided with a photosensor, such as a photodiode, for detecting the light beam reflected from the signal recording surface. Based on the photosensor output, read-out signals of the data signals, focusing error signals and tracking error signals are formed. Based on these error signals, focusing servo and tracking servo control operations are performed, such that, even if the optical disk is subjected to de-centering or deviation from true planarity during its rotation, the light beam projected on the signal recording surface may be converged correctly on the recording track formed on the signal recording surface.

In such type of optical pickup device, it has been proposed to reduce the size or the focal distance of the optical device adapted for converging the light beam on the signal recording surface, such as an object lens, to shorten the optical distance between the semiconductor laser element and the signal recording surface and to thereby reduce the size of the pickup device.

However, in the optical pickup device in which the distance between the semiconductor laser element and the signal recording surface is shortened, so-called return light to the semiconductor laser element increases. The return light means the light beam fraction which is reflected by the signal recording surface of the disk and returned to the semiconductor laser unit. In general, an increase in the return light results in increased noise due to increased light intensities, which in turn gives rise to various inconveniences, such as fluctuations in the light emitting power. Hence, it may become occasionally impossible to perform correct write and/or read operations for data signals.

A so-called gain waveguide type laser element is suited to be used as the semiconductor laser element of the optical pickup unit which is reduced in size. The semiconductor laser element may be classified into a so-called refractivity index waveguide type element oscillating in a single mode and a so-called gain waveguide type element oscillating in a multiple mode. By comparison, the gain waveguide type laser element is subject to the noise due to return light to a lesser extent than the refractivity index waveguide type element and hence may be used advantageously as the above mentioned laser element.

However, the gain waveguide type laser element exhibits a larger astigmatic difference than the refractive index waveguide type laser element. The light beam emitted by the semiconductor laser element is subject to astigmatism due to the astigmatic difference proper to the semiconductor laser element. For this reason, the beam spot formed on the signal recording surface is not truly circular as shown at (b) in FIG. 1 but assumes the shape of ellipses having their long axies extending in mutually perpendicular directions, depending on the de-focusing directions, as shown at (a) and (c) in FIG. 1.

If the contour of the beam spot 51 is changed as shown at (a) and (c) in FIG. 1, as a result of de-focusing, the surface measure of the beam spot 51 on the recording track $t_R$ being thus changed, the minimum tracking error signal level position and the maximum RF signal level position are not coincident with each other nor with the focusing position at which jitter of read or written data signals becomes least, as shown in FIG. 2, so that non-symmetricities of the tracking error signal level and the RF signal level are caused with respect to the focusing position.

As a result of these non-symmetricities of the tracking signal level and the RF signal level with respect to the focusing position, it may become occasionally impossible to effect focusing or tracking servo operations on occurrence of de-focusing due to de-centering or deviation from planarity of the optical disk.

In the optical pickup device employing the gain waveguide type laser element, such astigmatism is corrected by a plane parallel glass which is inclined a predetermined angle with respect to the optical axis of the light beam and which is placed on a light path along which the light beam is dispersed or converged. This aberration correction plate is provided, for example, between the semiconductor laser element and a beam splitter which is adapted for transmitting the light beam reflected by the signal recording surface towards the photosensors.

In the above described optical pickup device, it has been proposed to provide a light emitting/receiving composite unit to reduce the size of the device further. This composite unit is formed by the semiconductor laser element and split detectors on a unitary semiconductor substrate, these detectors functioning as the photosensors. On the semiconductor substrate, there is provided a beam splitter prism whereby the light beam emitted by the semiconductor laser element is caused to exit the semiconductor substrate at a predetermined angle with respect to the semiconductor substrate so as to be projected on the signal recording surface of the optical disk, the light beam reflected by the signal recording surface being received by the split detectors.

For reducing the size of the pickup device, these detectors employed in the light emitting/receiving composite unit are composed of first to third juxtaposed light receiving elements each having a rectangular light receiving surface. The state of the light beam received by these detectors, for example, the state of energy distribution on a cross-sectional surface of the flux of the light beam, is changed as a function of the relative position between a beam spot formed by the convergence of the light beam from the semiconductor laser element on the signal recording surface and the recording track on the signal recording surface. The tracking error signals are formed by comparing the outputs of the first and third light receiving elements provided on both sides of the photodetectors. On the other hand, the focusing error signals are formed by comparing the output of the second light receiving elements at the central portions of the photodetectors with the outputs of the second and third light receiving elements.

However, it is not possible with the optical pickup device employing the light emitting/receiving composite unit formed by the detectors to compensate for the above described non-symmetricities of the tracking error signal with respect to the focusing position, even with the use of the aberration correcting plate formed by a plane parallel glass inclined at a predetermined angle with respect to the optical axis of the light beam.

Thus, when forming the tracking error signal in the above described split detectors, the second light receiving element at the center of the detectors proves to be an insensitive zone. Consequently, the portion of the light beam received by the detectors which is in the vicinity of the optical axis of the light beam cannot be received. In regard to aberration correction by the aberration correction plate, although astigmatism can be compensated by the plate, coma aberration is likely to occur as a result of compensation for astigmatism. The effect of coma aberration becomes more pronounced in a region further away from the optical axis of the light beam. Hence, the effect of coma aberration on the output signal becomes larger in the photodetector having an insensitive central zone, such as the above described detectors, thus giving rise more readily to the above described non-symmetricities of the tracking error signal with respect to the focusing position.

It is also difficult with the optical pickup device employing the aberration correction plate for correcting the astigmatism to reduce the size of the pickup device on account of the spatial requirement for the aberration compensation plate.

OBJECT AND SUMMARY OF THE INVENTION

It is an object of the present invention to provide an optical pickup device in which the effect of the astigmatic difference proper to the semiconductor laser element may be sufficiently compensated and the characteristics of the device associated with de-focusing may be improved.

It is another object of the present invention to provide an optical pickup device in which a semiconductor laser element that is subject to adverse effects by the return beam to a lesser extent, such as a gain waveguide type laser element, is used to reduce the size of the device.

It is yet another object of the present invention to provide an optical pickup device in which astigmatism may be corrected without employing an aberration correcting plate.

The optical pickup device according to the present invention includes a semiconductor laser element as a light source. The light beam emitted by the semiconductor laser element is projected on an optical disk on which circumferentially extending recording tracks are formed, and the light reflected by the disk is detected to form read and/or record data signals. Photosensors for sensing the reflected light to generate tracking error signals are provided with central insensitive zones. The semiconductor laser element is so arranged that the light beam is projected on the optical disk so that the meridional plane of the light beam orthogonal to the junction plane of semiconductor layers of the semiconductor laser element is at such an angle with respect to a tangential line drawn to one of the recording tracks of the optical disk that non-symmetricities on both sides of said tangential line as a function of the de-focusing direction of the beam spot on the disk may be compensated.

According to the present invention, the meridional plane of the light beam is at a certain predetermined angle with respect to a tangential line drawn to a given recording track on the optical disk, so that non-symmetricities on both sides of the above mentioned tangential line, brought about in dependence upon the de-focusing direction, may be compensated. Also the light beam is free from coma aberration, so that, in cases wherein the light beam emitted by the semiconductor laser unit is subject to astigmatism, it does not occur that the reflected light from the recording track differs in intensity depending on the de-focusing direction, despite the fact that each of the photodetectors adapted to produce the tracking error signal is provided with the inoperative central zone.

DETAILED DESCRIPTION OF PREFERRED EMBODIMENTS

Figure 1:
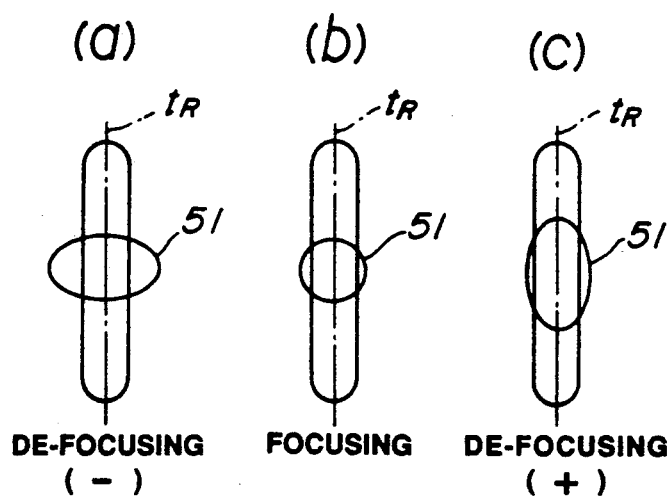
FIG. 1 is a diagrammatic view showing the contour of a beam spot formed on an optical disk by a conventional optical pickup device.
Figure 2:
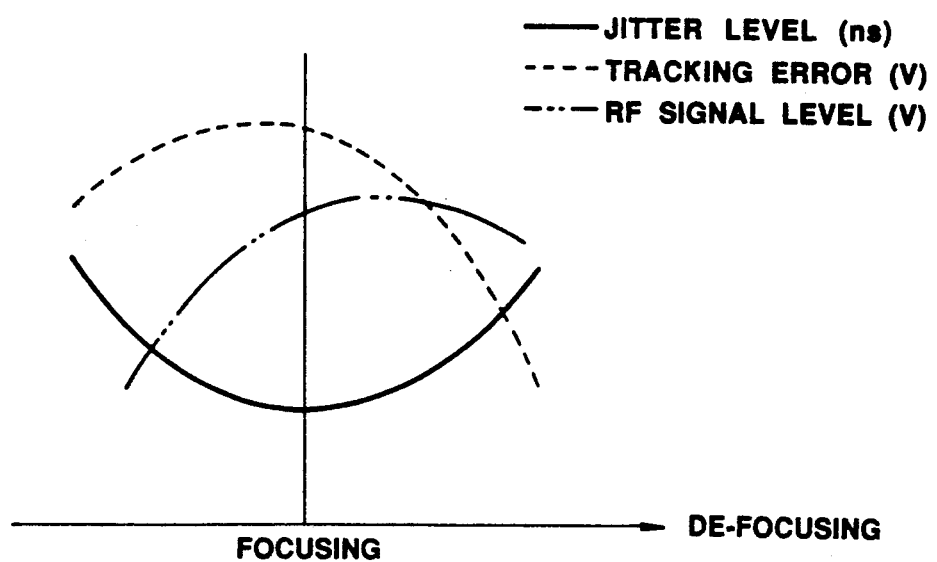
FIG. 2 is a chart showing certain characteristics of the conventional optical pickup device.

By referring to the drawings, certain preferred embodiments of the present invention will be explained in more detail.

Figure 3:
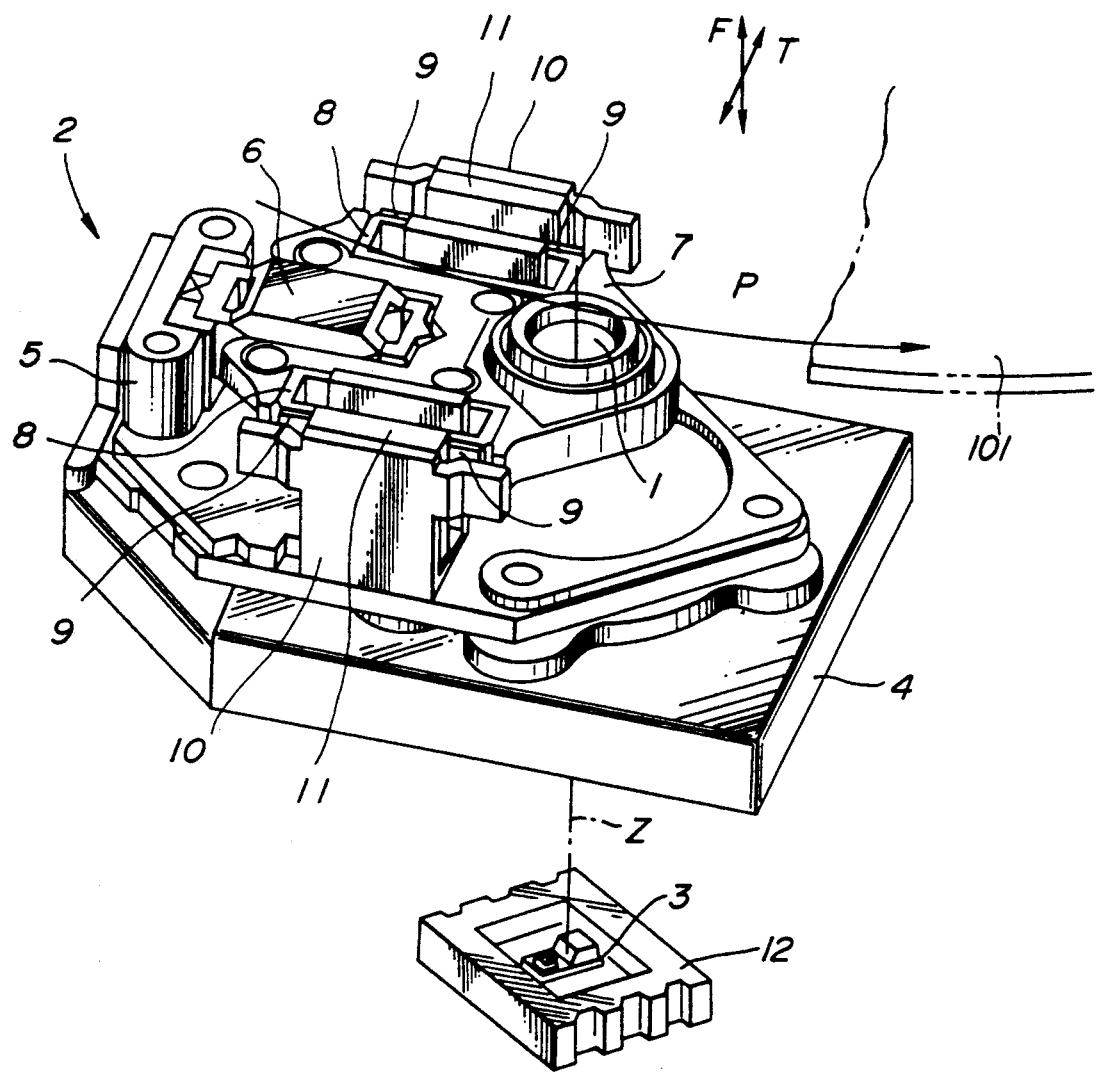
FIG. 3 is a perspective view showing a construction of an optical pickup device according to the present invention.

Referring to FIG. 3, an optical pickup device according to the present invention includes an object lens driving unit 2 for driving an object lens 1 for converging a light beam projected on an optical disk 101 on the signal recording surface of the optical disk 101 in two directions, that is, in a direction parallel to the optical axis of the object lens 1 and in a direction lying within a plane orthogonal to the optical axis, and a light emitting/receiving composite unit 3 formed by a semiconductor laser element and a light receiving element.

The object lens driving unit 2 includes a lens bobbin 7 supported on a support 5 provided upright on a supporting base plate 4 so that the lens bobbin may be moved in the above mentioned two directions by way of a movable supporting arm member 6. This arm member 6 is formed of a resilient material, such as synthetic resin, and includes a first hinge 6a and a second hinge 6b. These hinges 6a and 6b are of reduced thicknesses and may be displaced in mutually perpendicular directions.

On the lens bobbin 7 are mounted the above mentioned object lens 1, a pair of focusing coils and two pairs of tracking coils 9. Magnets 11, 11 are mounted on a pair of yokes 10, 10 mounted upright on the supporting base plate 4. These paired magnets 11, 11 are mounted for facing the focusing coils 8 and the tracking coils 9. These coils 8, 9, the yokes 10 and the magnets 11 make up a magnetic circuit. That is, when a focusing drive current based on focusing error signals is supplied to the focusing coils 8, the lens bobbin 7 is driven along the optical axis of the object lens 1, that is, along the so-called focusing direction, as shown by an arrow F in FIG. 3. Also, when a tracking driving current based on the tracking error signal is supplied to the tracking coils 9, the lens bobbin 7 is driven along a direction included within the optical axis of the object lens 1, on a so-called tracking direction, as indicated by an arrow T in FIG. 3.

The object lens driving unit 2 is mounted with the object lens 1 facing the optical disk 101. At this time, the optical axis Z of the object lens 1 is approximately normal to the optical disk 101, while the tracking direction is approximately normal to the tangential direction of a recording track $t_R$ formed along the circumference of the optical disk 101, as indicated by an arrow P in FIG. 3.

Figure 4:
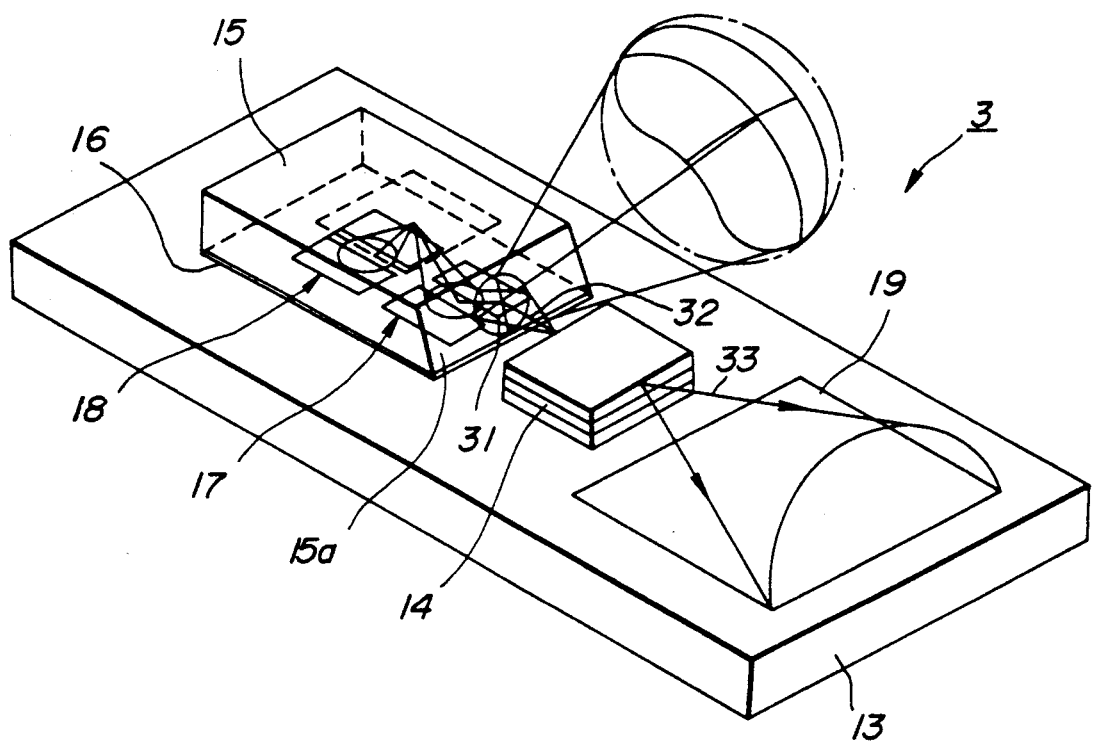
FIG. 4 is a perspective view showing a construction of a light emitting/receiving composite unit of the optical pickup device shown in FIG. 3.

This light emitting/receiving composite unit 3 is mounted within a package 12 and, as shown in FIG. 4, provided with a semiconductor substrate 13. On this semiconductor substrate 13 is formed the above mentioned semiconductor laser element 14 formed by a lamination of a plurality of semiconductor layers, inclusive of the semiconductor substrate 13. The semiconductor laser element 14 is a so-called gain waveguide type semiconductor laser element performing a multi-mode oscillation and adapted to undergo the noises due to the return light beam from the optical disk 101.

This semiconductor laser element 14 exhibits so-called astigmatic difference so that the light beam 31 emanating from this laser element 14 undergoes astigmatism. That is, the apparent light emitting position within the meridional plane of the light beam 31, viz. the plane perpendicular to the junction surfaces of the semiconductor layers making up the semiconductor laser element 14 and including the optical axis, is at the end face position of the semiconductor laser element 14, whereas the apparent light emitting position within the sagittal plane of the light beam 31, that is, the plane parallel to the aforementioned junction surface and inclusive of the optical axis, is at a position recessed from the end face by about 20 to 30 μm into the interior of the semiconductor laser element 14. Consequently, the equiphase wave surface of this light beam is bent most prominently within the meridional plane, with the curvature becoming least within the sagittal plane.

In a direction along which one light beam 31 is emitted from the semiconductor laser element 14, there is secured a beam splitter prism 15 on the semiconductor substrate 13, such as with an adhesive, for facing the laser element 14. This beam splitter prism 15 has its side facing the semiconductor laser element 14 inclined by a predetermined angle with respect to the optical axis 32 of the light beam 31 from the semiconductor laser element 14 and coated by a transmitting/reflecting film 15a. That is, the light beam 31 emanating from the semiconductor laser element 14 is partially reflected by the transmitting/reflecting film 15a so as to exit the substrate 13 at a predetermined angle.

On the semiconductor substrate 13 and at an area where the beam splitter prism 15 is provided, there are formed first and second split detectors 17, 18, that is, light receiving units, each composed of first to third light receiving elements.

In a direction along which another light beam 33 is emitted from the semiconductor laser element 14, there is formed a monitoring detector 19 on the semiconductor substrate 13 for receiving the other light beam 33. This monitoring detector 19 functions to detect the intensity of the light beam emitted by the semiconductor laser element 14 to control the light emitting power of the semiconductor laser element 14 on the basis of the detected light intensity and with use of an automatic power control circuit, not shown.

Figure 6:
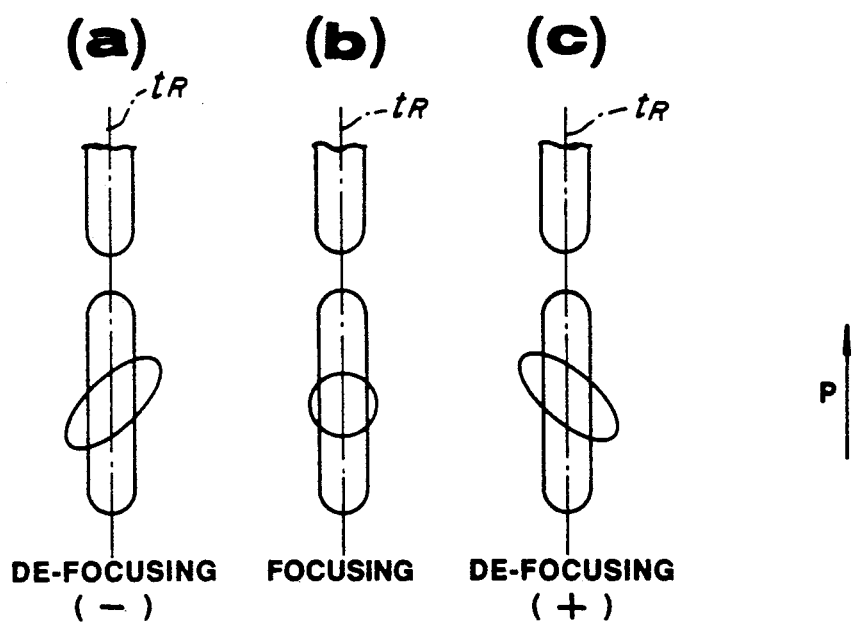
FIG. 6 is a diagrammatic view showing the contour of a light beam formed on the optical disk by the optical pickup device shown in FIG. 3.

The light beam 31 exiting the light emitting/receiving composite unit 3 is incident on the object lens 1, as shown in FIG. 3, so as to be projected on the signal recording surface of the optical disk 101. Meanwhile, the light emitting/receiving composite unit 3 is provided so that the meridional plane of the light beam is at an angle of approximately 45° with respect to the tangential direction of the recording track $t_R$ of the optical disk 101 indicated by the arrow P in FIG. 3. In case of correct focusing, the beam spot 34 formed on the signal recording surface of the optical disk 101 is truly circular in contour, as shown at b in FIG. 6. However, should a so-called de-focusing occur, the beam spot formed on the signal recording surface assumes the shape of ellipses having their long axes inclined by about 45° with respect to the recording track $t_R$, as indicated in FIG. 6(a) and (c).

The light beam 31 projected on the signal recording surface is reflected by this recording surface before again reaching the transmitting/reflecting film 15a by way of the object lens 1. The light beam thus again reaching the transmitting/reflecting film 15a is transmitted through the film 15a to proceed into the beam splitter prism 15 before being received by the first and the second split detectors 17, 18 via a prescribed light path.

Figure 5A:
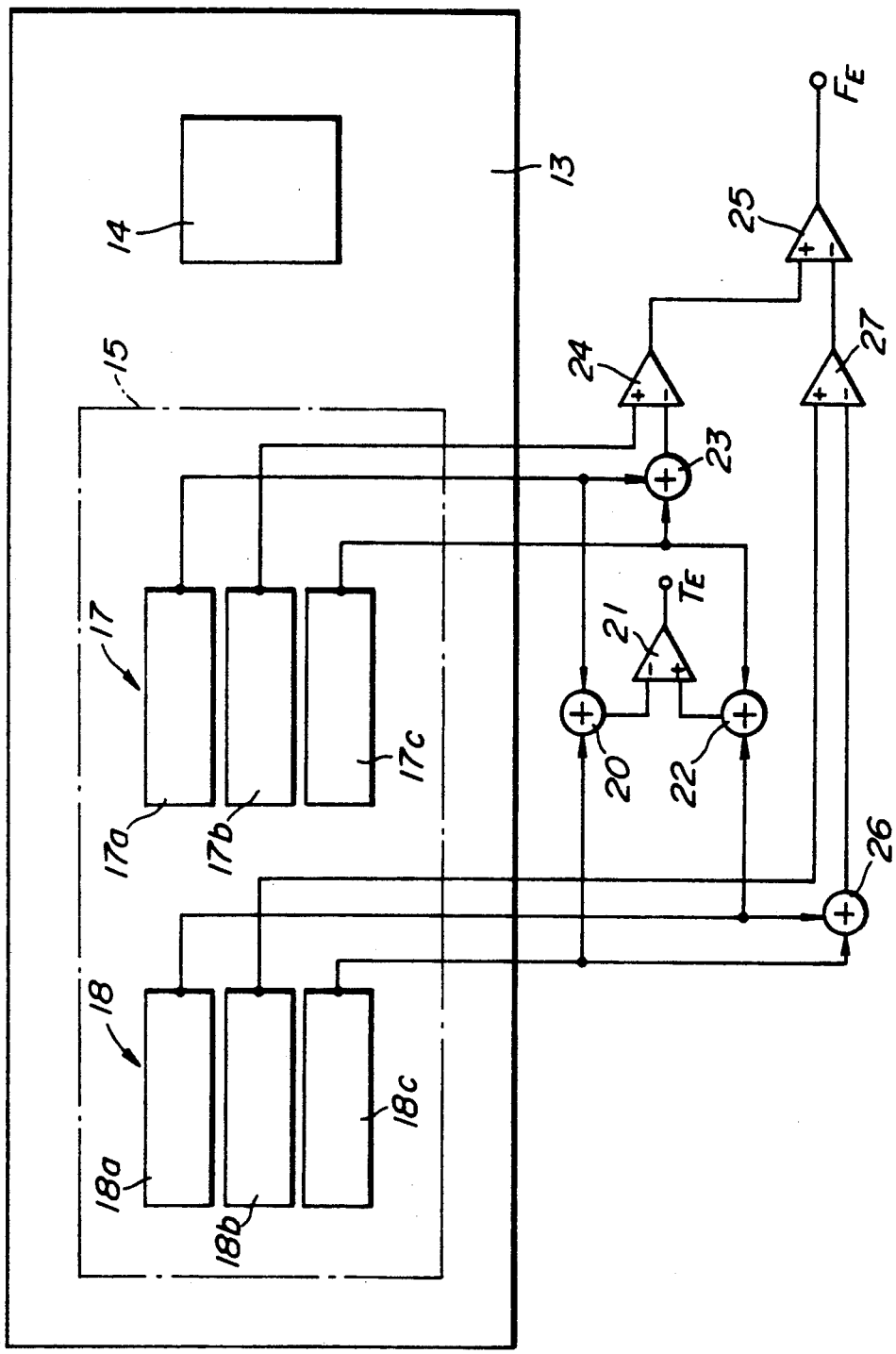
FIG. 5A is a diagrammatic view showing a construction of detectors of the light emitting/receiving composite unit and a circuit for processing output signals from the split detectors.
Figure 5B:
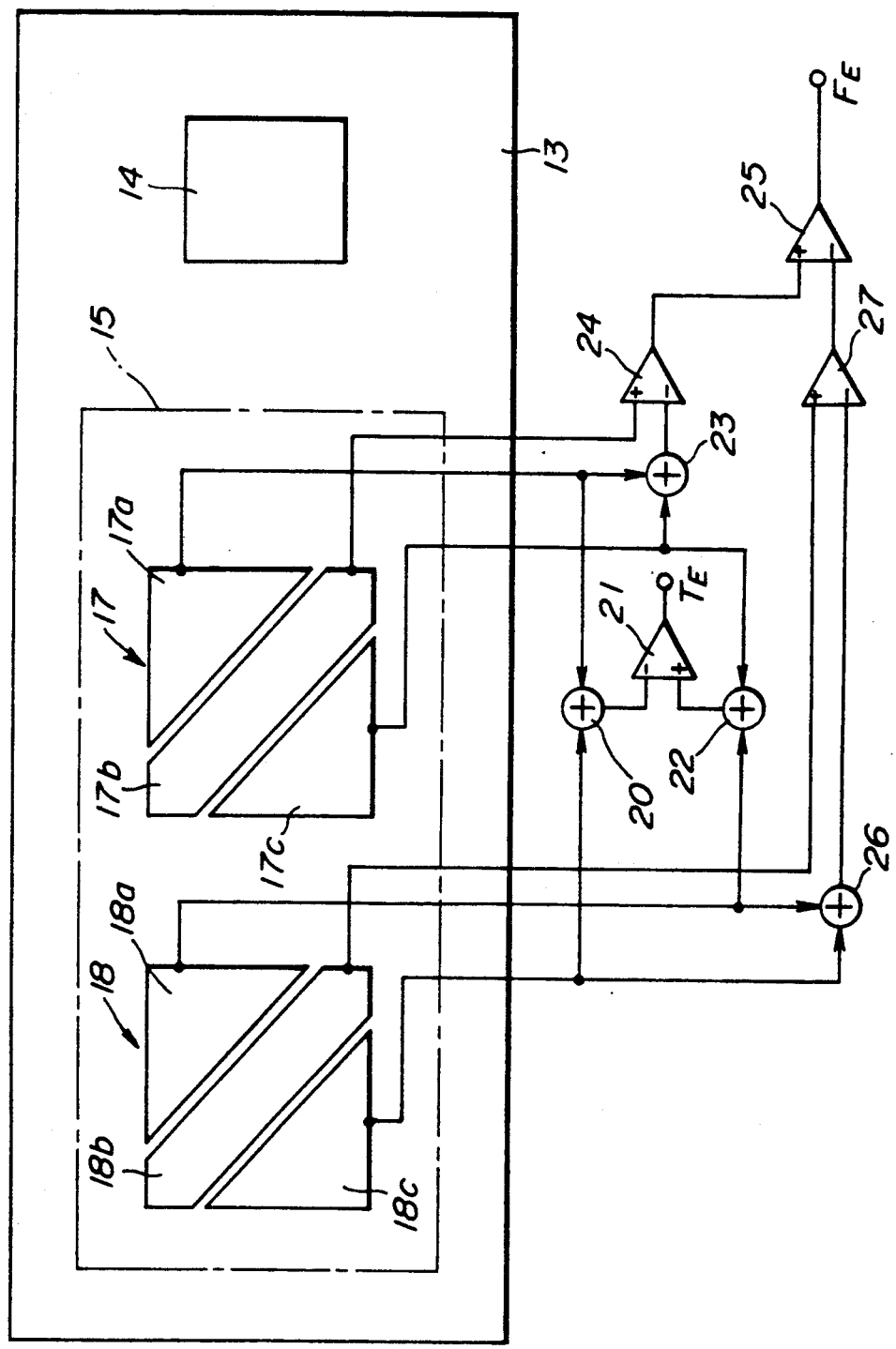
FIG. 5B is a diagrammatic view showing a modified construction of the detectors of the light emitting-/receiving element.

As shown in FIGS. 5A and 5B, the detectors 17, 18 are split into first to third light receiving elements 17a, 17b, 17c; 18a, 18b, 18c, having their light receiving surface lying parallel to one another.

In the embodiment shown in FIG. 5A, the light receiving elements of the detectors 17, 18 are arrayed parallel to the meridional plane of the light beam, whereas, in the embodiment shown in FIG. 5B, the light receiving elements of the detectors 17, 18 are arrayed parallel to the tangential line drawn to the recording tracks $t_R$.

A tracking error signal $T_E$ is formed by a so-called push-pull method and on the basis of output signals of the first and third light receiving elements 17a, 17c, 18a, 18c provided on the respective lateral sides of the detectors 17, 18. That is, the output of the first light receiving element 17a provided on one lateral side of the first detector 17 and the output of the third light receiving element 18c provided on the other lateral side of the second detector 18 are combined by a first adder 20 before being supplied to a non-inverting input terminal of the first subtractor 21. The output of the third light receiving element 17c provided on the other lateral side of the first detector 17 and the output of the first light receiving element 18a provided on the one lateral side of the second detector 18 are combined by a second adder 22 before being supplied to a non-inverting terminal of the first subtractor 21. The output of this first subtractor 21 represents the tracking error signal $T_E$.

That is, in producing the tracking error signal $T_E$, the second light receiving elements 17b, 18b forming the central portions of the detectors 17, 18 represent dead zones, or insensitive zones. The width of each of the second light receiving elements 17b, 18b as these dead zones accounts for about 10 to 40% of the radius of the light beam incident on the detectors 17, 18.

On the other hand, the outputs of the first light receiving element 17a and the third light receiving element 17c of the first detector 17 are combined by a third adder 23 before being supplied to an inverting input terminal of a second subtractor 24. The non-inverting input terminal of the second subtractor 24 is supplied with an output of the second light receiving element 17b of the first detector 17. The output signal of the second subtractor 24 is supplied to a non-inverting input terminal of a third subtractor 25.

The outputs of the first light receiving element 18a and the third light receiving element 18c of the first light receiving element 18a of the second detector 18 are combined by a fourth adder 26 before being transmitted to an inverting input terminal of a fourth subtractor 27. To the non-inverting input terminal of this fourth detector 18 is supplied the output of the second light receiving element 18b of the second split detector 18. The output signal of this fourth subtractor 27 is transmitted to an inverting input terminal of the third subtractor 25. The output signal of this third subtractor 25 represents a focusing error signal $F_E$.

The sum of the output signals of the detectors 17 and 18 represents the data read-out signal (RF signal).

Figure 7:
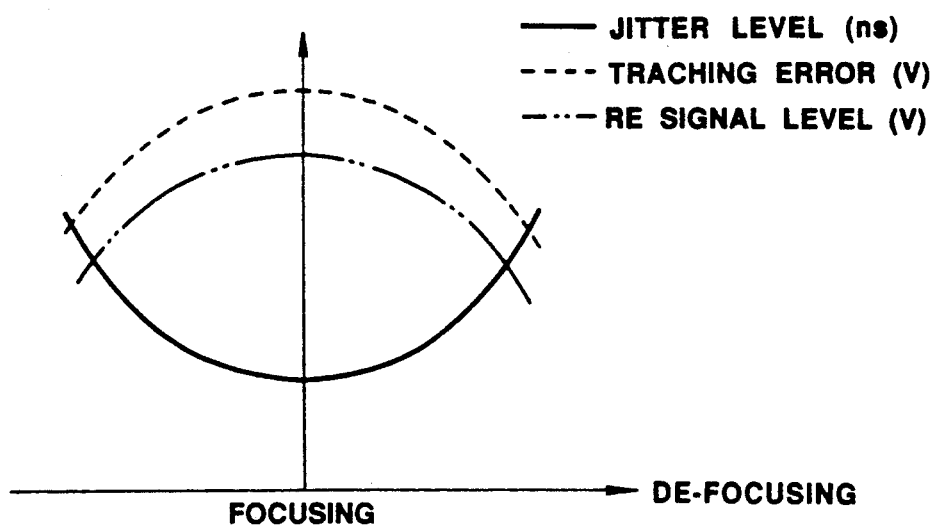
FIG. 7 is a chart showing certain characteristics of the optical pickup device shown in FIG. 3.

In the above described optical pickup device of the present invention, should the so-called de-focusing occur, as shown in FIG. 6, no difference in the beam spot surface measured on the recording track $t_R$ is caused with the directions in which the de-focusing has occurred. For this reason, in the present optical pickup device, with the focusing position being the position at which jitter in the data signals read from or written on the optical disk 101 becomes least, this focusing position is coincident with the position at which the level of the tracking error signal $T_E$ and that of the RF signal become maximum, as shown in FIG. 7. That is to say, the symmetrical relation of the signal levels of the RF signal and the tracking error signal $T_E$ with respect to the focusing position is maintained.

Inasmuch as the symmetry of the level of the RF signal and the tracking error signal $T_E$ with respect to the focusing position is maintained in this manner, so-called, de-servicing is less likely to occur at the time of de-focusing caused by de-centering or deviation from true planarity of the optical disk 101.

Figure 8:
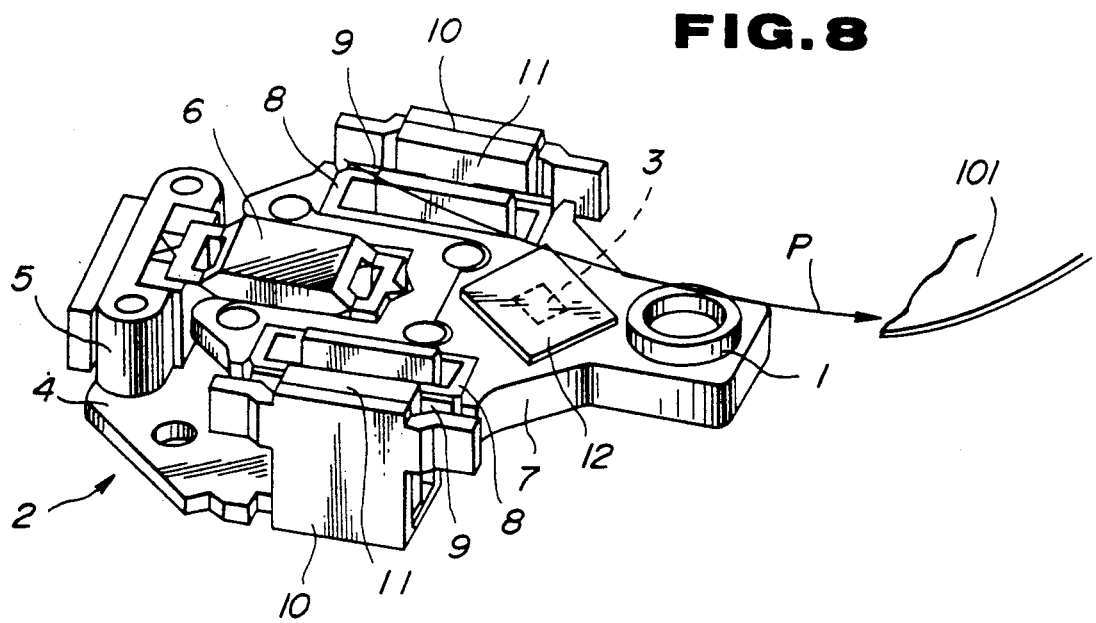
FIG. 8 is a perspective view showing a modified construction of the optical pickup device according to the present invention.
Figure 9:
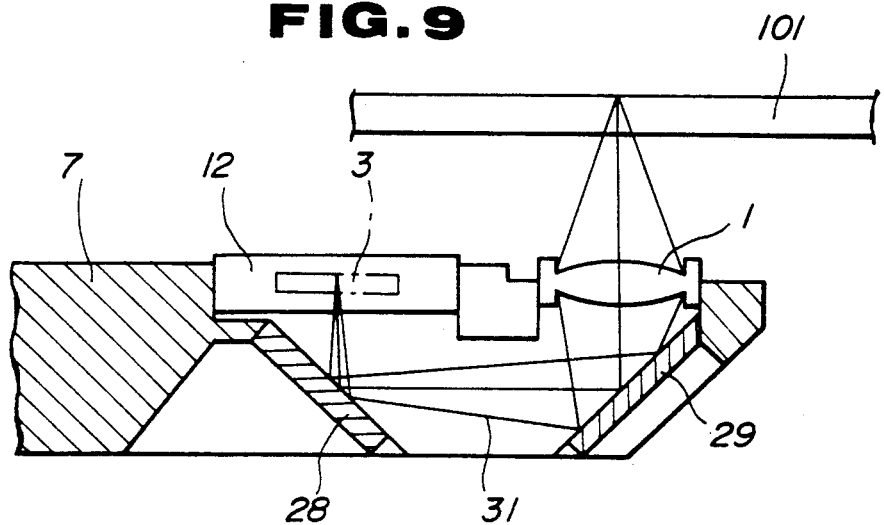
FIG. 9 is a longitudinal sectional view showing essential parts of the optical pickup device shown in FIG. 8.

In the optical pickup device of the present invention, as shown in FIG. 8, the package 12 mounting the above described light emitting/receiving composite unit 3 may be provided on the lens bobbin 7. In the present embodiment, as shown in FIG. 9, a light beam 31 emanating from the semiconductor laser element 14 is guided by first and second mirrors 28, 29 mounted on the lens bobbin 7 before being incident on the optical disk 101.

In this present embodiment, the light emitting/receiving unit 3 is similarly arranged so that the meridional plane of the light beam is at an angle of approximately 45° with respect to the tangential direction of the recording track $t_R$ of the optical disk 101. Hence, should a so-called de-focusing occur, the beam spot formed on the signal recording surface assumes the shape of ellipses having their long axes extending at an angle of approximately 45° with respect to the recording track $t_R$, as indicated in FIG. 6. In this manner, the symmetrical relation of the signal levels of the tracking error signal $T_E$ and the RF signal may be maintained with respect to the focusing position, as shown in FIG. 7.

Figure 10:
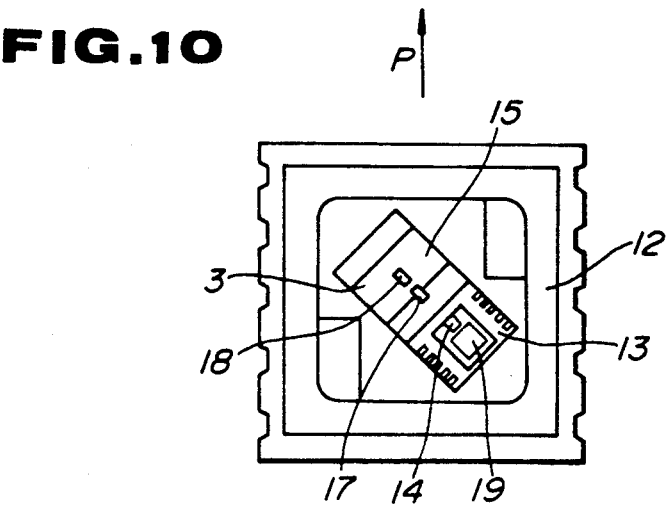
FIG. 10 is a plan view showing a modified example of the mounting state of the light emitting/receiving element of the optical pickup device shown in FIG. 8.

In the above described embodiments, the light emitting/receiving composite unit 3 may also be mounted at an angle of approximately 45° with respect to the package 12, as shown in FIG. 10. With the use of the thus mounted light emitting/receiving composite unit 3, should the outer lateral side of the package 12 be positioned on the basis of a reference plane which is selected to be parallel to the tangent of the recording track $t_R$, for example, the meridional plane of the light beam emanating from the light emitting/receiving unit 3 may be set at a predetermined angle with respect to the tangential line to facilitate the assembling operation.

In the above described embodiments, the angle between the meridional plane and the tangential line to the recording track $t_R$ is not limited to 45°. For example, it may be in the range of 30° to 60° to maintain sufficient symmetry of the signal levels of the tracking error signal $T_E$ and the RF signal with respect to the focusing position.

In the optical pickup device of the present invention, the photosensor may also be constituted by only one detector 17.

In this case, the first adder 20 and the second adder 22 in the circuitry for generating the error signals $T_E$ and $F_E$ shown in FIGS. 5A and 5B may be dispensed with and the output of the first light receiving element 17a is supplied to an inverting input terminal of the first subtractor 21, while the output of the third light receiving element 17c is supplied to a non-inverting input terminal of the first subtractor 21. The output signal of the first subtractor 21 represents the aforementioned tracking error signal $T_E$. Also the third subtractor 25, the fourth adder 26 and the fourth subtractor 27 may be dispensed with and the output signal of the second subtractor 24 represents the focusing error signal $F_E$.

The present invention is not limited to an optical pickup device provided with the light emitting/receiving composite unit, but may also be applied to an optical pickup device in which the semiconductor laser unit and the photodetectors are provided separately in a frame of an optical system. In addition, if the detector construction is of the type having an inoperative central zone, the photodetectors may be divided into two parts, instead of three parts, as in the above embodiment.

According to the present invention, the meridional plane of the light beam is at a certain predetermined angle with respect to a tangential line drawn to a given recording track on the optical disk, so that non-symmetricities of the beam spot on the optical disk on both sides of the above mentioned tangential line may be compensated. Also the light beam is free from the coma aberration otherwise caused by using an aberration correcting plate formed by a plane parallel plate.

Thus, in cases wherein the light beam emitted by the semiconductor laser unit is subject to astigmatism, it does not occur that the reflected light from the recording track differs in intensity depending on the de-focusing direction, despite the fact that each of the photodetectors adapted to produce the tracking error signal is provided with the inoperative central zone.

From the foregoing it is seen that the present invention provides an optical pickup device wherein a semiconductor laser element affected to a lesser extent by the return light beam, such as the gain waveguide type laser element, is employed to reduce the size of the device, and wherein the effects due to the astigmatic difference may be corrected sufficiently to improve the characteristics associated with de-focusing.

What is claimed is:

1. A recording and/or reproducing apparatus for an optical disk wherein a light beam emitted by a semiconductor laser element is converged by an object lens so as to be irradiated on the optical disk having a plurality of tracks on which data signals are previously recorded, reflected light from said optical disk being detected for reading and/or recording the data signals, wherein the apparatus comprises:

photodetector means having an insensitive central zone and adapted to receive said reflected light to produce tracking error signals; and means for projecting said light beam of said semiconductor laser element along an optical axis onto said disk so that a plane extending orthogonally to a junction plane of semiconductor layers of the semiconductor laser element and including said optical axis from an acute angle with respect to a line tangential to the plurality of tracks such that asymmetries on opposite sides of said tangential line resulting from de-focusing of the light beam on the disk are compensated.

2. Apparatus according to claim 1 wherein said photodetector means includes at least two light receiving elements, one on either side of said insensitive central zone.

3. Apparatus according to claim 2 wherein said insensitive central zone has a longitudinal axis substantially parallel to the direction of said tangential line to said plurality of tracks.

4. Apparatus according to claim 2 wherein said insensitive central zone has a longitudinal axis inclined at an angle of 30° to 60° relative to the direction of said tangential line to said plurality of tracks.

5. Apparatus according to claim 2 wherein a length of said insensitive central zone is 10% to 40% of a radius of said light beam incident on said photodetector means.

6. Apparatus according to claim 1 wherein said orthogonally extending plane makes an angle of 30° to 60° relative to said tangential line to said recording tracks.

7. Apparatus according to claim 6 further comprising a semiconductor substrate and a beam splitter prism mounted on said semiconductor substrate, said semiconductor laser element and said photodetector means being mounted on said semiconductor substrate and said photodetector means being adjacent to said beam splitter prism.

* * * * *

UNITED STATES PATENT AND TRADEMARK OFFICE
CERTIFICATE OF CORRECTION

PATENT NO. : 5,181,193
DATED     : Jan. 19, 1993
INVENTOR(S) : Kume et al.

It is certified that error appears in the above-identified patent and that said Letters Patent is hereby corrected as shown below:

TITLE PAGE:
In the Abstract, line 11, after "beam" insert --extending--
Col. 7, line 57, after "called" delete ","
    same line, change "de-servicing" to --de-servoing--

Col. 9, line 31, change "from" to --forms--
Col. 10, line 22, change "tracks" to --track--

Signed and Sealed this

Eighth Day of March, 1994

Attest:

BRUCE LEHMAN

Attesting Officer    Commissioner of Patents and Trademarks